United States Patent [19]

Sasaki et al.

[11] Patent Number: 4,783,915

[45] Date of Patent: Nov. 15, 1988

[54] SELF-PROPELLED SNOW REMOVING MACHINE

[75] Inventors: Ichiro Sasaki; Takeo Ogano; Tomoichiro Takasaki; Toru Fukuda, all of Saitama, Japan

[73] Assignee: Honda Giken Kogyo Kabushiki Kaisha, Tokyo, Japan

[21] Appl. No.: 62,503

[22] Filed: Jun. 12, 1987

[30] Foreign Application Priority Data

| Jun. 18, 1986 | [JP] | Japan | 61-142591 |
| Jun. 18, 1986 | [JP] | Japan | 61-142592 |
| Jun. 18, 1986 | [JP] | Japan | 61-142593 |
| Jun. 18, 1986 | [JP] | Japan | 61-142594 |
| Jun. 18, 1986 | [JP] | Japan | 61-142595 |
| Jun. 18, 1986 | [JP] | Japan | 61-92808 |
| Jul. 23, 1986 | [JP] | Japan | 61-173454 |

[51] Int. Cl.$^4$ .............................................. E01H 5/09
[52] U.S. Cl. .......................................... 37/251; 37/257
[58] Field of Search ................................ 37/241–259

[56] References Cited

U.S. PATENT DOCUMENTS

| 1,577,561 | 3/1926 | Chiles | 37/244 |
| 2,536,166 | 1/1951 | Garland | 37/245 |
| 2,751,697 | 6/1956 | Bucher | 37/251 |
| 2,777,217 | 1/1957 | Klauer | 37/251 |
| 3,043,028 | 7/1962 | Merry et al. | 37/250 |
| 3,115,714 | 12/1963 | Johann | 37/250 |
| 3,423,856 | 1/1969 | Fiske | 37/244 |
| 3,580,351 | 5/1971 | Mollen | 37/257 |
| 3,938,400 | 2/1976 | Konyha | 37/244 |
| 4,062,135 | 12/1977 | Dobberpuhl | 37/245 |
| 4,255,879 | 3/1981 | Greider | 37/251 |
| 4,514,917 | 5/1985 | Ogano et al. | 37/249 |

Primary Examiner—E. H. Eickholt
Attorney, Agent, or Firm—Irving M. Weiner; Joseph P. Carrier; Pamela S. Burt

[57] ABSTRACT

A self-propelling snow removing machine includes a body frame extending rearwardly and upwardly with a steering handle attached to an upper end thereof, a snow removing mechanism operatively mounted on a front portion of the body frame, a running mechanism operatively mounted on a lower portion of the body frame, an engine mounted on the body frame and having an output shaft extending forwardly of the body frame, and a power transmitting mechansim supported on the body frame and operatively coupled to the engine, the power transmitting mechanism including a transmission for connecting the engine output shaft to the running mechanism and for connecting the engine output shaft to the snow removing mechanism. The engine has a cylinder with its axis inclined laterally of the body frame, the power transmitting mechanism is mounted on the body frame forwardly of the engine, and further includes a gear mechanism for coupling the engine output shaft to the transmission and a clutch. A self-propelled snow removing machine includes a body frame, a snow removing mechansim operatively mounted on a front portion of the body frame, a running mechanism operatively mounted on a lower portion of the body frame, an engine mounted on the body frame, and a power transmitting mechanism supported on the body frame and operatively coupled to the engine, the power transmitting mechanism including a transmission for connecting the engine to the running mechanism and for connecting the engine to the snow removing mechanism. The power transmitting mechanism has a gear mechanism for coupling the engine to the transmission and a clutch. The power transmitting mechanism includes a transmission case housing the transmission therein and a clutch housing the clutch, the snow removing mechanism including implement covers attached to a front portion of the transmission case, while the transmission case, the clutch housing, and the implement covers are successively coupled together.

18 Claims, 8 Drawing Sheets

SELF-PROPELLED SNOW REMOVING MACHINE

BACKGROUND OF THE INVENTION

1. Field of the Invention

The present invention relates to a snow removing machine, and more particularly to a self-propelled snow removing machine having a single engine for driving crawlers, an auger driven by the engine for clearing away snow, and a blower for discharging the snow.

2. Description of the Relevant Art

U.S. Pat. No. 4,514,917 discloses a self-propelled working vehicle such as a self-propelled snow removing tractor having a single engine for driving crawlers, an auger driven by the engine for clearing away snow, and a snow blower for discharging the snow. In the disclosed snow-removing tractor, the engine is operatively coupled to the crawlers through a first belt having a tensioner and a main transmission, and also to a drive shaft of the auger and the blower through a second belt having a tensioner.

The snow-removing tractor also has a subtransmission interposed between the engine and the main transmission, for selectively permitting the snow-removing machine to travel at a low speed while removing snow, and to run at a high speed while moving to and from a place where snow is to be removed. The second belt is trained around a pulley coupled to a rear end of the auger/blower drive shaft which extends longitudinally in a body frame housing the main transmission and others. The pulley is fixed to the end of the drive shaft within the body frame. The drive shaft is disposed in a blower housing, and the snow blower having radial fins is secured to the drive shaft in the blower housing. To the front end of the drive shaft, there is operatively coupled a transverse auger shaft through an auger transmission comprising a worm and a pinion meshing therewith. The opposite ends of the auger shaft are supported on an auger cover. The auger which comprises a plurality of fins is mounted on the auger shaft.

Since the auger/blower drive shaft and the engine are interconnected by the second belt having the tensioner, the engine has to be positioned upwardly near the driver to keep a distance over which the second belt lies. As a result, the center of gravity of the vehicle is positioned relatively high, and the field of view of the driver is obstructed by an upper portion of the engine.

The engine power is transmitted from the engine to the crawlers and the auger/blower drive shaft through the first and second belts with their tension adjusted by the respective tensioners. The belt tension adjustment and belt replacement must be effected relatively frequently, and hence the snow-removing tractor needs relatively frequent maintenance. Inasmuch as the engine crankshaft and the auger/blower drive shaft have to be spaced a relatively large distance from each other, the snow removing tractor is large in size. One proposal to eliminate the frequent maintenance of the second belt would be to couple the auger/blower drive shaft to the engine through a friction-type multiplate clutch. In view of the fact that the snow-removing tractor is used in cold climates, dry-type multiplate clutches would be more preferable than wet-type multiplate clutches as the latter generate drag torque after clutch disengagement. However, it would be impossible to place such a dry-type clutch and a transmission mechanism within a transmission case. Therefore, it would be necessary to provide a clutch housing separately from the transmission case, resulting in a larger tractor size and an increased cost of manufacture. Also, such a snow-removing tractor would have to be arranged to allow engine power to be transmitted to the auger and the snow blower only when a control lever would be operated. This would make it undesirable to use a general clutch in which power transmission elements such as friction plates are normally held in frictional contact. Instead, a special clutch that would meet the above requirement as to the timing of engine power transmission would be required, with the result that the cost of the entire snow-removing tractor would be high.

When the auger and the snow blower are to be assembled into the body frame, the housing for accommodating the auger and the snow-removing tractor is first brought against the body frame axially of the auger/blower drive shaft. Then, bolt holes defined in a marginal flange of the housing which faces the body frame and bolt holes defined in a marginal flange of the body frame which faces the housing are held in registry with each other. The housing is fastened to the body frame by bolts inserted through the registered bolt holes and nuts threaded over the bolts. This assembling process is relatively tedious and time-consuming. The pulley on the auger/blower drive shaft is usually fixed by a bolt to the rear end thereof which extends into the body frame. For replacing the auger and/or the blower, it is necessary to detach a side cover of the body frame and then remove the pulley from the rear end of the auger/blower drive shaft by loosening the bolt and nut. Removal of the pulley requires other associated components such as the second belt to be also detached. Therefore, replacement of the auger and/or the blower is labor intensive and so is the maintenance thereof.

The present invention has been made in an effort to solve the aforesaid problems of the conventional self propelled snow-removing tractor.

SUMMARY OF THE INVENTION

It is an object of the present invention to provide a self-propelled snow removing machine which has a low center of gravity and allows the driver to have a wide field of view.

Another object of the present invention is to provide a self-propelled snow removing machine for which a maintenance process is simplified.

Still another object of the present invention is to provide a self-propelled snow removing machine which is compact in its entirety.

Yet another object of the present invention is to provide a self-propelled snow removing machine which employs a dry-type friction clutch in place of a tensioned belt without involving an increase in the size of the self-propelled snow removing machine and the cost of manufacture thereof.

A further object of the present invention is to provide a self-propelled, snow removing machine having a general clutch which is low in cost and capable of allowing engine power to be to an auger and a snow blower only when a control lever is operated.

A still further object of the present invention is to provide a self-propelled snow removing machine which can be assembled through a simple procedure.

A yet still further object of the present invention is to provide a self-propelled snow removing machine which has an auger and a snow blower that can be simply replaced and hence maintained.

To achieve the above objects, there is provided a self-propelled snow removing machine comprising a body frame; the body frame extending rearwardly and upwardly with a steering handle attached to an upper end thereof; a snow removing mechanism operatively mounted on a front portion of the body frame; a running mechanism operatively mounted on a lower portion of the body frame; an engine mounted on the body frame, the engine having an output shaft extending forwardly of the body frame; a power transmitting mechanism supported on the body frame and operatively coupled to the engine, the power transmitting mechanism including a transmission for connecting the engine output shaft to the running mechanism and for connecting the ,engine output shaft to the snow removing mechanism; the engine having a cylinder with its axis inclined laterally of the body frame; the power transmitting mechanism being mounted on the body frame forwardly of the engine; and the power transmitting mechanism further including a gear mechanism for coupling the engine output shaft to the transmission and a clutch.

There is also provided a self-propelled snow removing machine comprising: a body frame; a snow removing mechanism operatively mounted on a front portion of the body frame; a running mechanism operatively mounted on a lower portion of the body frame; an engine mounted on the body frame; a power transmitting mechanism supported on the body frame and operatively coupled to the engine; the power transmitting mechanism including a transmission for connecting the engine to the running mechanism and for connecting the engine to the snow removing mechainsm; the power transmitting mechanism having a gear mechanism for coupling the engine to the transmission and a clutch; the power transmitting mechanism including a transmission case housing the transmission therein and a clutch housing housing the clutch mechanism; the snow removing mechanism including implement covers attached to a front portion of the transmission case; and the transmission case, the clutch housing, and the implement covers being successively coupled together.

The transmission case has a front wall and the clutch housing case has a rear wall, the front and rear walls comprising a common partition.

The clutch housing is defined by a front wall of the transmission case and a rear wall of the implement covers.

The front wall of the transmission case is recessed rearwardly.

The self-propelled snow removing machine further includes connecting means for applying an urging force to the clutch to disengage the same, the connecting means including a control lever operable by the machine driver, and disconnecting means for applying an urging force to the clutch to disengage the same.

The snow removing implements include an implement drive shaft having a rear end extending rearwardly through a rear wall of the implement covers, a snow blower, and an auger; the snow blower having a plurality of fins spaced from each other in a direction in which the drive shaft is rotatable and projecting radially outwardly; and the rear wall of the implement covers being attached to the transmission case by a plurality of bolts disposed around the drive shaft and threaded from the side of the auger into the transmission case.

The clutch has an output shaft extending forwardly; the drive shaft having a rear end, the rear end and the output shaft being splined to each other rearwardly of the implement cover rear wall.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
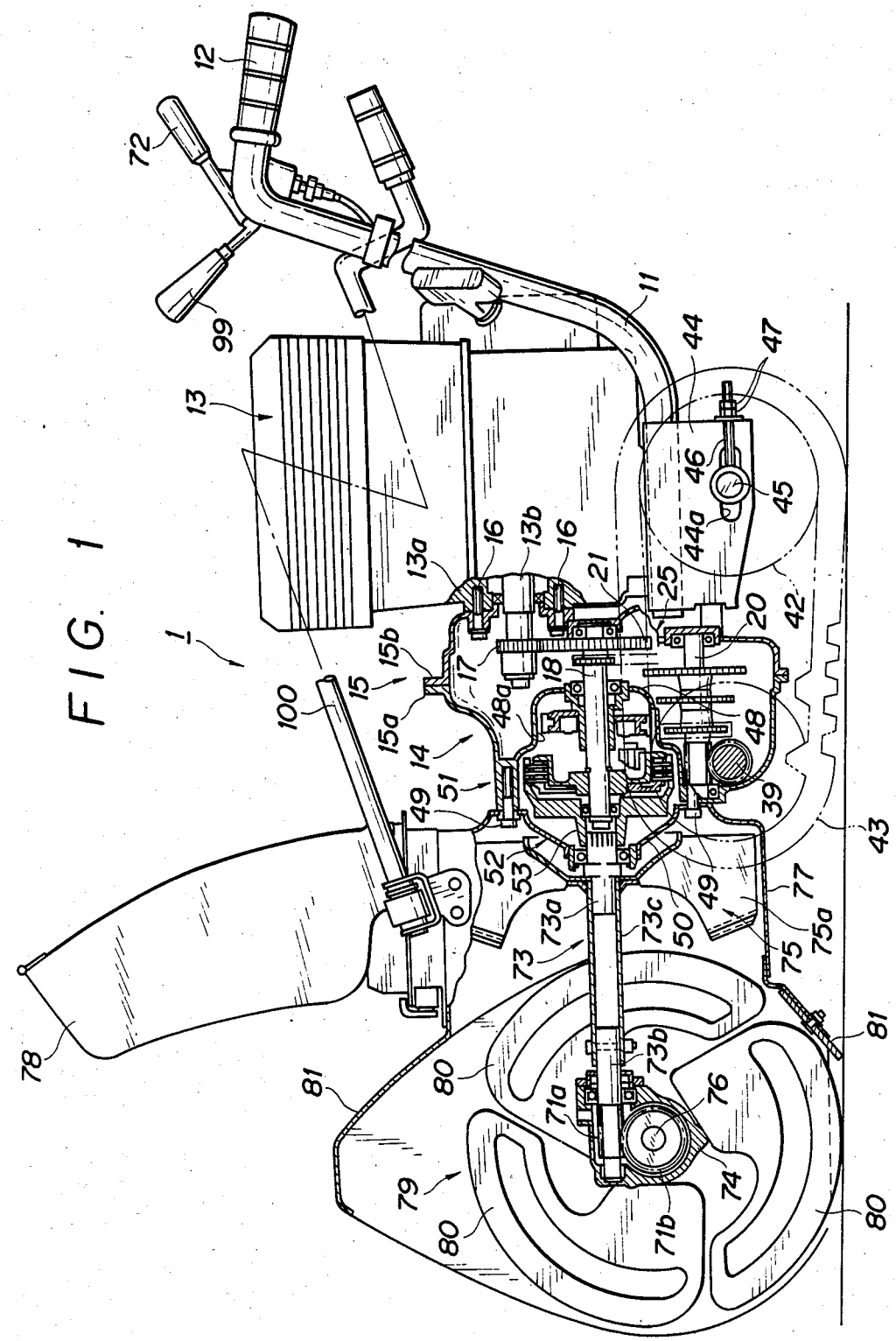
FIG. 1 is a side elevational view, partly cut away, of a self-propelled snow removing machine according to the present invention.

As shown in FIG. 1, a self-propelled snow-removing tractor or snow removing machine, generally designated by the reference numeral 1, has a body frame 11 curved rearwardly and upwardly and supporting a steering handle 12 on its upper end. An engine 13 is mounted on the body frame 11, the engine 13 having a crankshaft (output shaft) 13b extending forwardly. A clutch lever 72 and a transmission lever 99 are mounted on the frame 11 near the handle 12. The engine 13 has a crankcase 13a to which a transmission case 15 housing a transmission 14 as a power transmitting means is fixed by means of bolts 16. The crankshaft 13b projects into the transmission case 15 and has a distal end supporting a driver gear 17 secured thereto.

Figure 11:
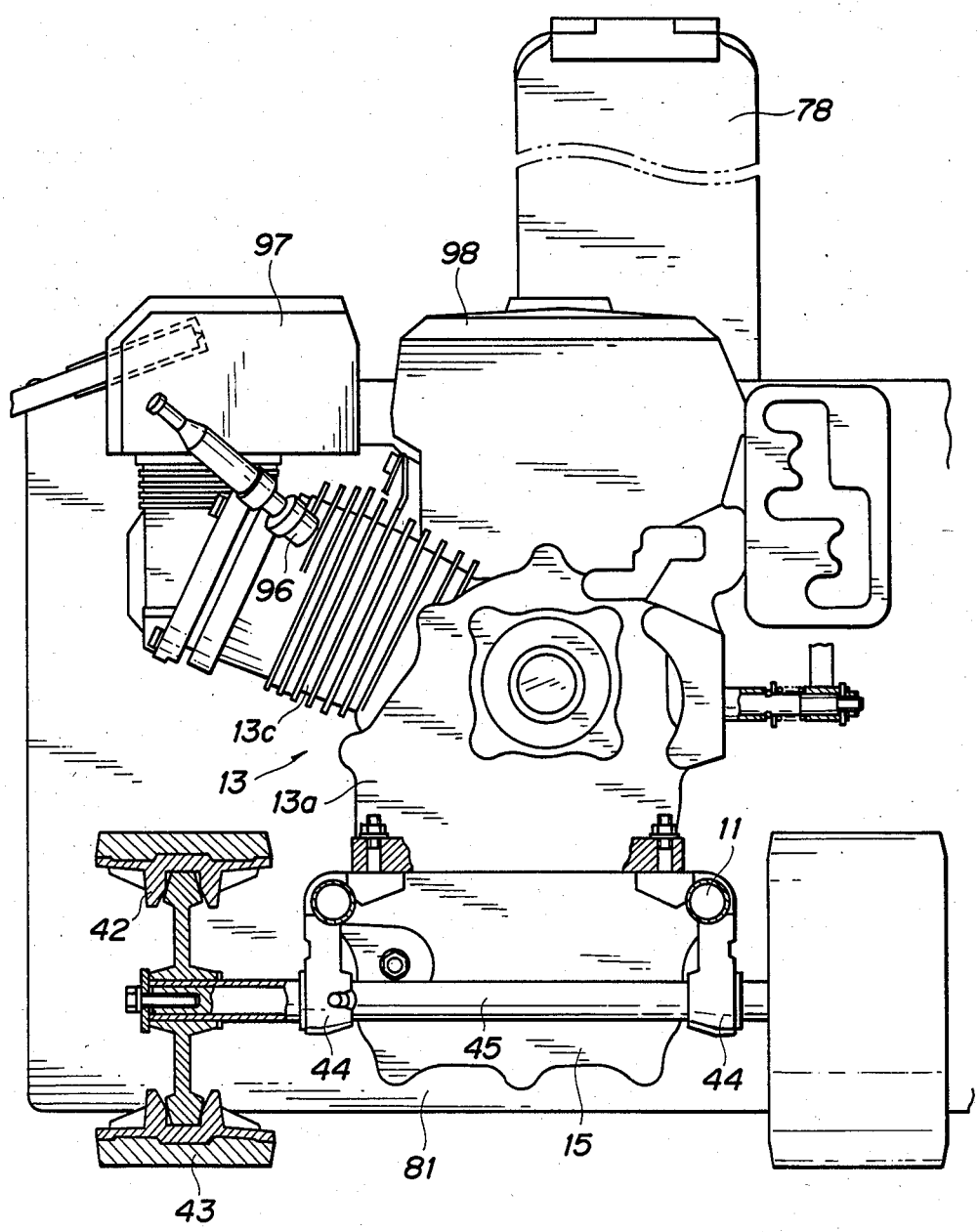
FIG. 11 is a rear elevational view, partly in cross section, of an engine and associated components.

As shown in FIG. 11, a cylinder block 13c is mounted on the crankcase 13a, the cylinder block 13c extending obliquely upwardly to the left. The cylinder block 13c defines therein a cylinder with its axis extending obliquely upwardly to the left. Denoted in FIG. 11 at 98 is a fuel tank installed on the top of the crankcase 13a, 97 an air cleaner disposed above the cylinder block 13c, and 96 a spark plug cap.

Figure 5:
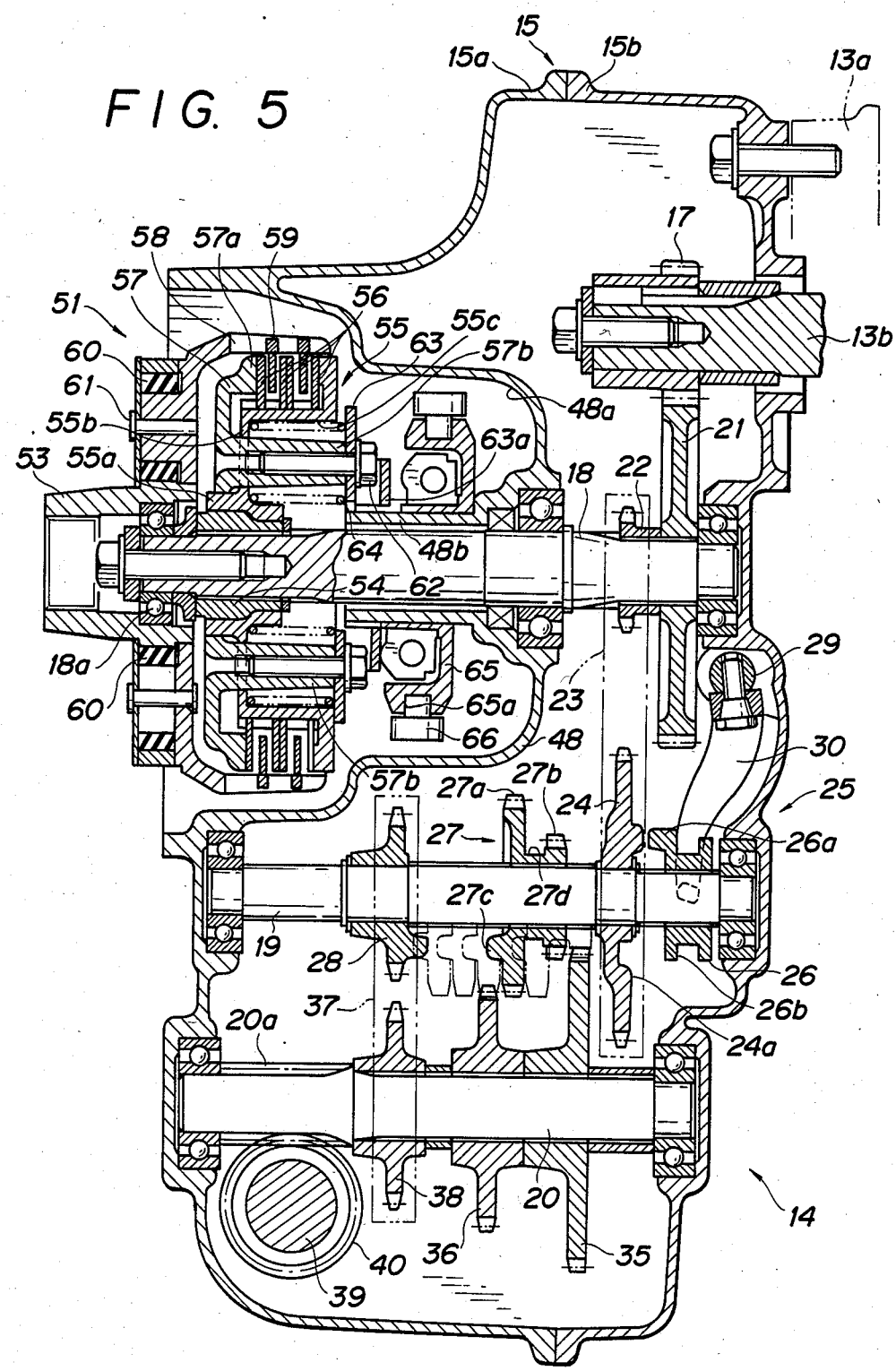
FIG. 5 is an enlarged vertical cross-sectional view of a transmission and a dry-type clutch.
Figure 6:
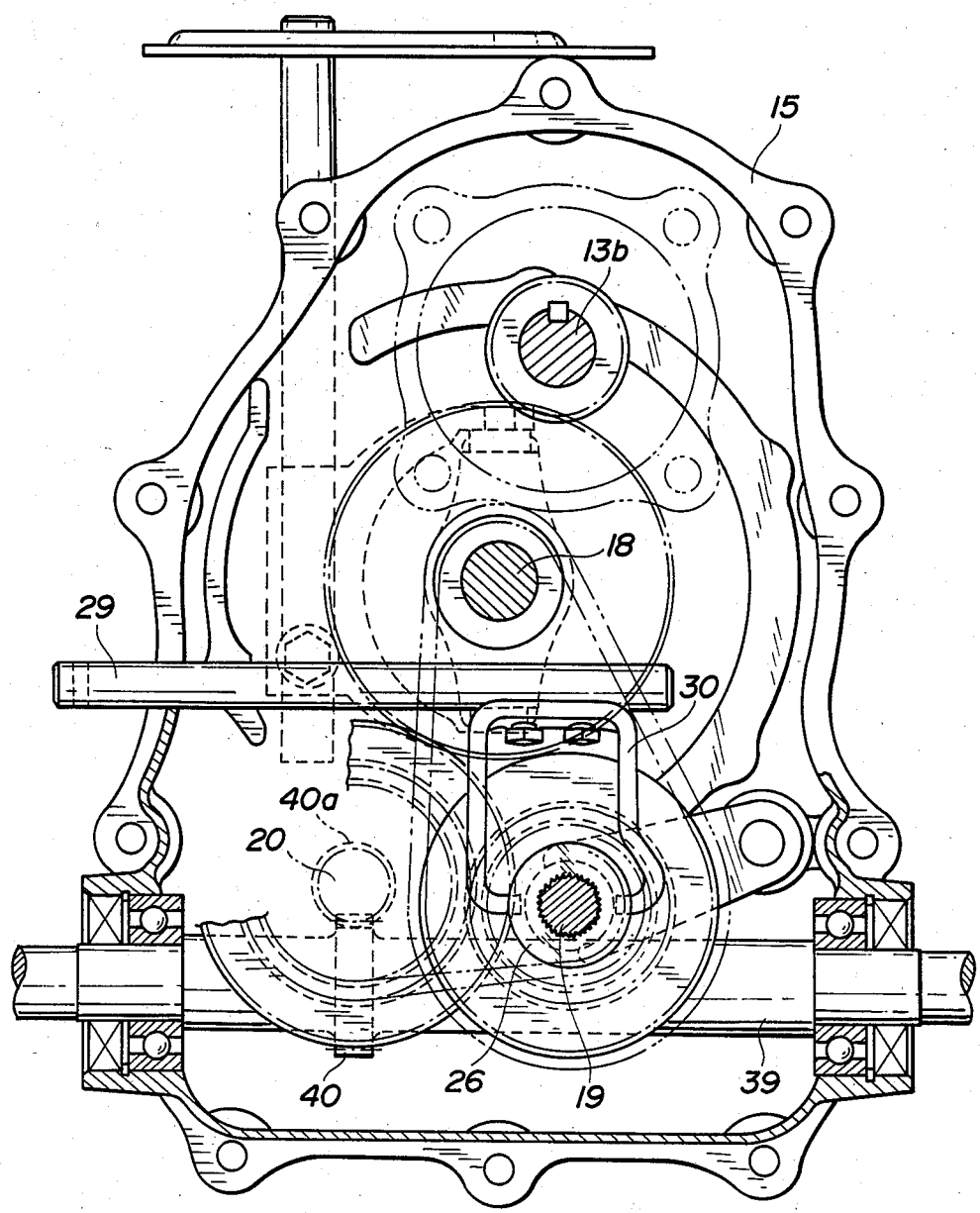
FIG. 6 is an enlarged vertical cross-sectional view of the transmission including a crawler control clutch.

As illustrated in FIG. 1, the transmission case 15 comprises two case members 15a, 15b joined to each other and separable from each other in the axial direction of the crankshaft 13b. As shown in FIGS. 5 through 8, the transmission 14 has an input shaft 18, a countershaft 19, and an output shaft 20 which are parallel to each other and rotatably supported in the transmission case 15. As shown in FIG. 5, the input shaft 18 supports thereon a driven gear 21 meshing with the driver gear 17 on the crankshaft 13b, and a driver sprocket 22 adjacent to the driven gear 21, the driven gear 21 and the driver sprocket 22 being splined to the input shaft 18 for rotation therewith. The input shaft 18 has a front end (lefthand end in FIGS. 1 and 5) which is connected to an auger 79 serving as a snow removing implement and a snow blower 75 through a dry-type friction multiplate clutch 51 (described later on).

A driven sprocket 24 is rotatably mounted on the countershaft 19. A chain 23 is trained around the driven sprocket 24 and the driver sprocket 22 on the input shaft 18. A crawler control clutch 25 includes a sleeve 26 splined to the countershaft 19 on the righthand side (FIG. 5) of the driven sprocket 24 so that the sleeve 26 is rotatable with the countershaft 19 but axially movable with respect thereto. A forward gear 27 and a reverse gear 28 are mounted on the countershaft 19 leftwardly of the driven sprocket 24. The driven sprocket 24 has engaging teeth 24a on its end face directed toward the clutch sleeve 26. Likewise, the sleeve 26 has engaging teeth 26a on its end face directed toward the driven sprocket 24, the engaging teeth 26a being engageable with the engaging teeth 24a of the driven sprocket 24. The sleeve 26 has an annular groove 26b defined in its outer circumference and in which the tip end of a clutch fork 30 fixed to a shift shaft 29 is fitted. Therefore, the sleeve 26 can be axially shifted by the clutch fork 30. When the sleeve 26 is moved to the left in FIG. 5, the engaging teeth 26a thereof engage the engaging teeth 24a of the driven sprocket 24, which is now fixed to the countershaft 19. The shift shaft 29 is connected to a control lever (not shown). The engaging teeth 26a of the sleeve 26 and the engaging teeth 24a of the driven sprocket 24 constitute the crawler control clutch 25.

Figure 7:
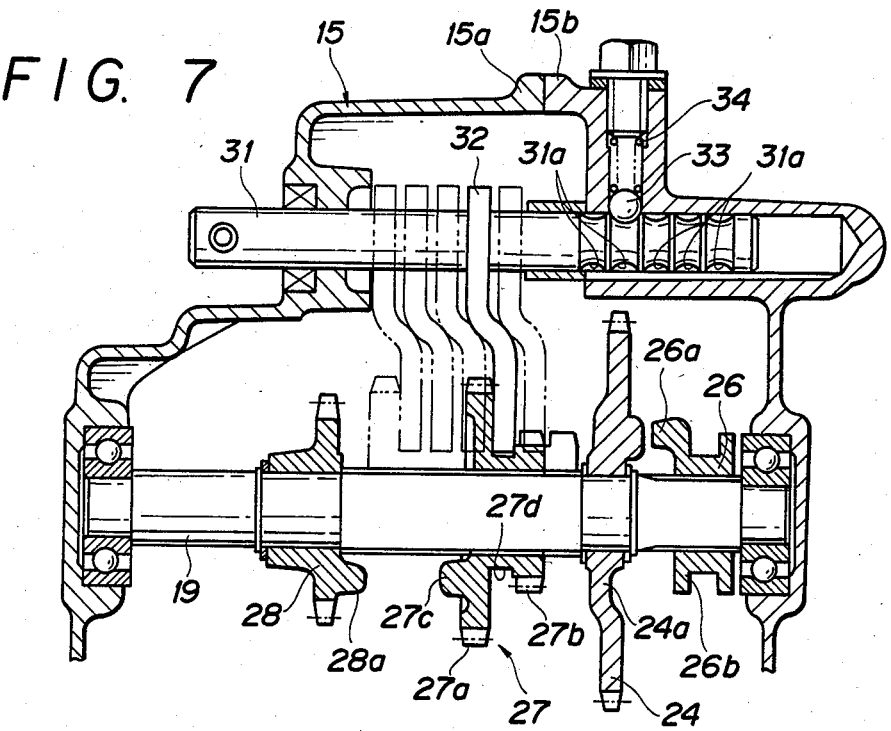
FIG. 7 is an enlarged cross-sectional view of a portion of the transmission.

The forward gear 27 is splined to the counter-shaft 19 for axial movement thereon. The reverse gear 28 is rotatably but axially immovably mounted on the countershaft 19. The forward gear 27 has a larger-diameter high-speed gear 27a and a smaller-diameter low-speed gear 27b integral therewith. The forward gear 27 also has an engaging projection 27c on its end face directed toward the reverse sprocket 28. As shown in FIG. 7, the forward gear 27 has an annular groove 27d defined between the high-and low-speed gears 27a, 27b, and a shift fork 32 fixed to a shift rod 31 is fitted in the annular groove 27d. The shift rod 31 is axially movably supported in the transmission case 15 substantially parallel to the counter-shaft 19 and coupled to the transmission lever 99. The shift fork 32 is responsive to the transmission lever 99 through the shaft rod 31 for shifting the forward gear 27 between five gear positions, i.e., a low-speed forward position, a neutral position, a high-speed forward position, a neutral position, and a reverse position, as indicated by the two-dot-and-dash lines in FIG. 7. In FIGS. 5 and 7, the shift fork 32 and the forward gear 27 are in one of the neutral positions. A ball 33 (FIG. 7) is resiliently biased by a spring 34 into one, at a time, of a plurality of annular grooves 31a defined in the shift rod 31. As the transmission lever 99 is operated, the spring biased ball 33 clicks into one of the grooves 31a.

As shown in FIG. 7, the reverse sprocket 28 has an engaging projection 28a on its end face directed toward the forward gear 27 for engagement with the engaging projection 27c of the forward gear 27. When the forward gear 27 is moved to the leftmost position, the engaging projection 28a of the reverse sprocket 28 engages the engaging projection 27c of the forward gear 27 to cause the sprocket 28 to rotate with the forward gear 27.

The output shaft 20 supports thereon a low-speed counter gear 35 and a high-speed counter gear 36 which are axially movably splined to the output shaft 20 and can mesh with the low- and high-speed gears 27b, 27a of the forward gear 27. The output shaft 20 also supports thereon a reverse driven sprocket 38 for rotation therewith. A chain 37 is trained around the reverse sprocket 28 and the reverse driven sprocket 38. The output shaft 20 has a worm 20a on its lefthand end, meshing with a worm wheel 40 fixed to a drive shaft 39 extending transversely through the transmission case 15. When the forward gear 27 is moved to the left from the position of FIG. 5, the low-speed counter gear 35 is brought into mesh with the low-speed gear 27b. When the forward gear 27 is moved to the right from the position of FIG. 5, the high-speed counter gear 36 is brought into mesh with the high-speed gear 27a.

Figure 2:
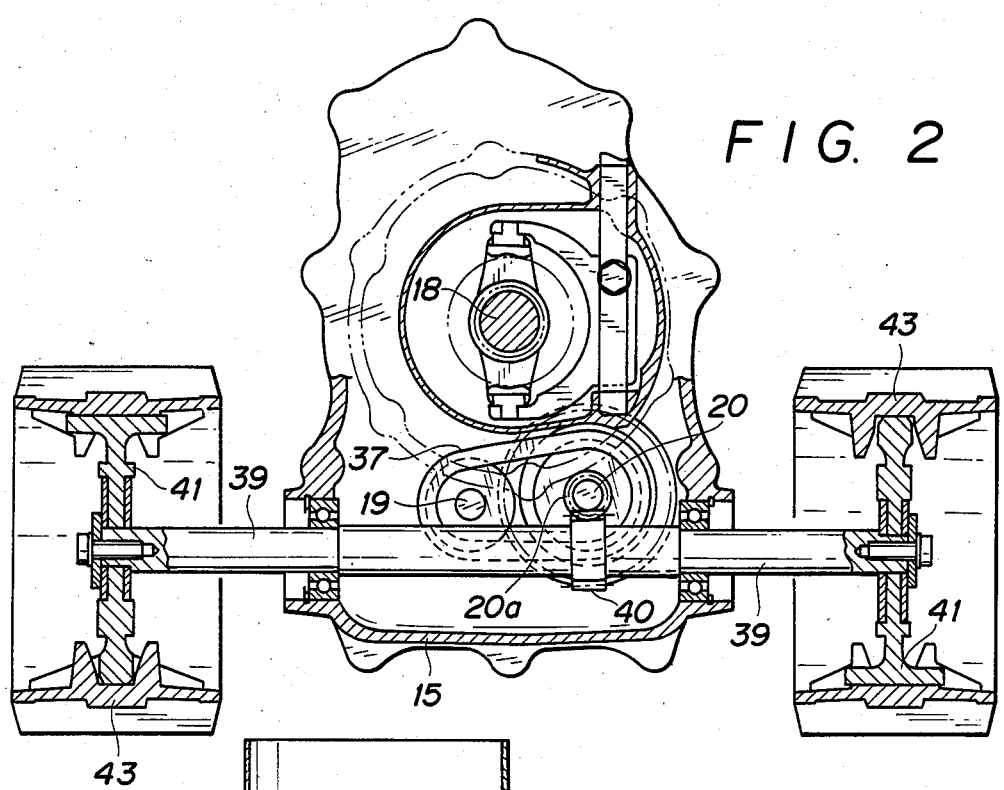
FIG. 2 is a vertical cross-sectional view showing a mechanism for transmitting drive power to crawlers.

As shown in FIG. 2, driver sprockets 41 are mounted respectively on the opposite ends of the drive shaft 39 for driving crawlers 43. The crawlers 43 are trained around these driver sprockets 41 and idler or driven sprockets 42, the crawlers 43 being disposed one on each side of the frame 11 and extending longitudinally thereof. As shown in FIG. 1, the idler sprockets 42 are mounted on the opposite ends, respectively, of a shaft 45 extending through longitudinal slots 44a defined in brackets 44 suspended from the frame 11. The shaft 45 is rotatably supported by bearings (not shown) movably disposed in the slots 44a. The position of the shaft 45 in the longitudinal direction of the frame 11 can be varied by moving the bearings in the slots 44a. The bearings can be fixed in position by bolts 46 threaded forwardly in the brackets 44 and secured by lock nuts 47.

Turning back to FIGS. 1 and 5, a partition 48 disposed in a front portion of the transmission case 15 has a recess 48a recessed rearwardly and opening forwardly. The recess 48a is closed at its front end by a blower rear cover 50 fastened to the front edge of the transmission case 15 by means of six bolts 49 threaded through the cover 50 into the transmission case 15, the bolts 49 being equally spaced around the cover 50. The bolts 49 are threaded from the side of the auger 79. The cover 50 and the partition 48 jointly define therebetween a clutch housing 52 accommodating therein a dry-type friction multiplate clutch 51 (auger control clutch). The clutch 51 does not produce drag torque after disengagement since it is of the dry type. The dry-type clutch 51 serves to connect and disconnect the input shaft 18 extending through the transmission case 15 and an output shaft (auger/blower driver shaft) 53 connected to the auger 79 and the blower 75 and extending through the cover 50. The output shaft 53 is rotatably supported on the input shaft 18 by a bearing 18a.

The dry-type clutch 51 in FIG. 5 is shown as being engaged in its upper half and disengaged in its lower half. In the clutch housing 52, a sleeve 54 is splined to the input shaft 18 for co-rotation therewith, and a clutch hub 55 is fixedly fitted over the sleeve 54. The clutch hub 55 comprises a boss 55a fitted over the sleeve 54, a disc portion 55b extending radially outwardly from the boss 55a, and a tubular portion 55c bent axially from an outer peripheral end of the disc portion 55b. Over the tubular portion 55c, there are fitted a plurality of driver discs 56 for rotation with and axial movement on the tubular portion 55c. A piston 57 is axially slidably fitted over the outer periphery of the boss 55a. A disc 60 made of a resilient material is fixed to the output shaft 53, and a clutch drum 58 is coupled to the disc 60 by means of rivets 61. A plurality of driven discs 59 are mounted on the inner peripheral surface of the clutch drum 58 for rotation with and axial displacement on the clutch drum 58. The driver and driven discs 56, 59 are axially alternately interleaved and can be brought into frictional contact when being pressed by the piston 57. The piston 57 has a presser 57a on its outer peripheral edge for pressing the driver and driven discs 56, 59 together. The piston 57 also has a plurality of integral engaging members 57b on its radially inner portion which are spaced certain distances in the circumferential direction. The engaging members 57b project slidably through corresponding holes defined in the disc portion 55b of the clutch hub 55 toward the engine 13. A circular retainer 63 is fixed by bolts 62 to the ends of the engaging members 57b which are closer to the engine 13. A plurality of return springs 64 are disposed over the engaging members 57b, respectively, between the retainer 63 and the clutch hub 55, for normally urging the retainer 63 and hence the piston 57 to the right as shown in FIG. 5. The retainer 63 has an engaging member 63a engageable with a shifter 65 which is axially slidably fitted over a tubular portion 48b integrally extending from the partition 48 and loosely fitted over the input shaft 18. The shifter 65 has a groove 65a defined in its outer periphery and in which a fork 66 is fitted.

Figure 8:
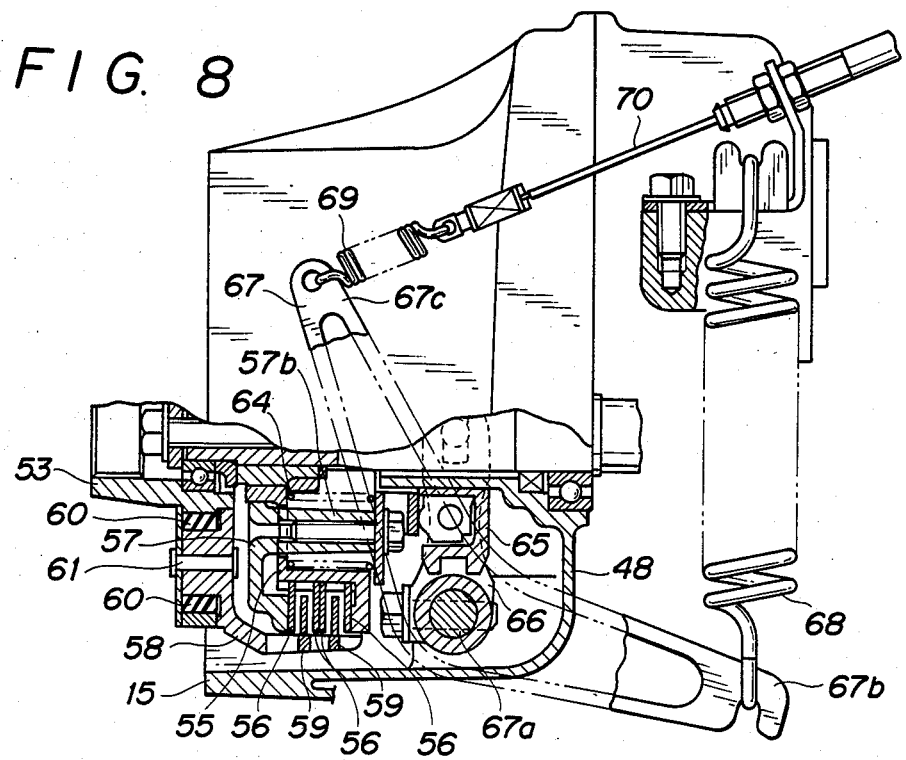
FIG. 8 is an enlarged fragmentary cross-sectional view of the dry-type clutch.

As shown in FIG. 8, the fork 66 is mounted on an angularly movable shaft 67a of a release lever 67 supported on the transmission case 15, the fork 66 being movable in response to the release lever 67. A spring 68 as a clutch disengagement biasing means is disposed between one end 67b of the release lever 67 and a portion of the transmission case 15. The resilient force of the spring 68 is larger than that of the springs 64. The spring 68 applies its resilient force to the release lever 67 of the dry-type clutch 51 in a direction opposite to the force applied to the clutch lever 72, thus urging the shifter 65 toward the engaging member 63a. The other end 67c of the release lever 67 is connected through a damper spring 69 and a cable 70 to the clutch lever 72 on the handle 12. When the clutch lever 72 is operated, the release lever 67 is turned with the shaft 67a clockwise in FIG. 8 against the resiliency of the spring 68. At the same time, the shifter 65 is moved to the right in FIG. 5 away from the engaging members 57b. When the clutch lever 72 is not operated, the release lever 67 is biased by the spring 68 to turn counterclockwise in FIG. 8 for thereby causing the shifter 65 to press the engaging members 57b to disconnect the clutch 51. The fork 66, the release lever 67, the damper spring 69, and the cable 70 jointly constitute a path for transmitting the clutch control force from the clutch lever 72 to the clutch 51. As the shifter 65 is spaced from the engaging member 63a, the piston 57 is forced by the springs 64 to move to the right (FIG. 5) to press the driver and drive discs 56, 59 together, whereupon the input and output shafts 18, 53 are connected to each other. Conversely, when the shfiter 65 presses the engaging member 63a, the piston 57 is moved to the left against the biasing force of the springs 64 to disconnect the input and output shafts 18, 53 from each other.

Figure 3:
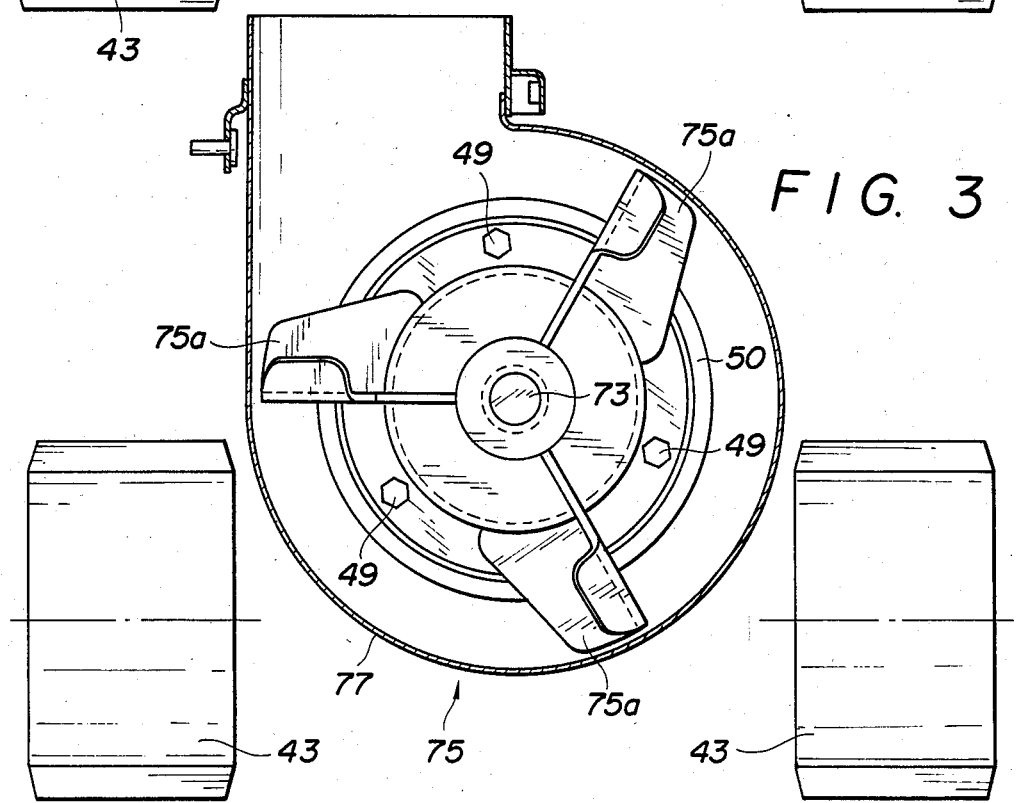
FIG. 3 is a sectional front elevational view of a snow blower.
Figure 9:
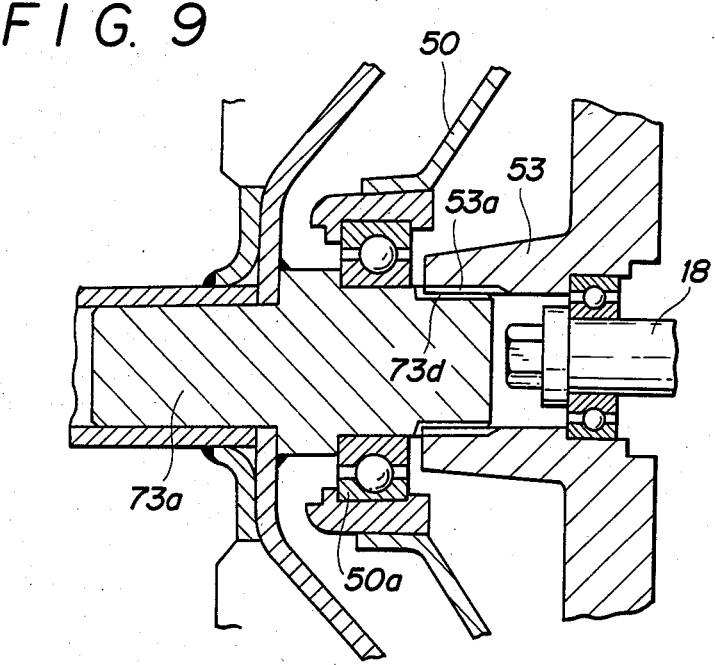
FIG. 9 is an enlarged fragmentary cross-sectional view of a structure by which the base end of an auger/blower drive shaft and the output shaft of a clutch mechanism are coupled to each other.

As shown in FIG. 1, a power transmitting shaft 73 for driving the auger 79 and the snow blower 75 is coupled to the output shaft 53 of the dry-type clutch 51. The drive shaft 73 comprises a first solid shaft 73a having one end coupled to the output shaft 53, a second solid shaft 73b having a worm 71a and rotatably supported in an auger bracket 74, and a third hollow shaft 73c fitted over the first and second solid shafts 73a, 73b and interconnecting them. As shown in FIG. 9, the first solid shaft 73a is rotatably supported in the cover 50 by a bearing 50a. The shaft 73a has splines 73d on its rear end which are held in mesh with splines 53a on the inner periphery of the output shaft 53. The snow blower 75 is fixed to the outer periphery of the end of the hollow shaft 73c which is disposed over the first solid shaft 73a. As shown in FIG. 3, the snow blower 75 comprises three fins 75a angularly spaced from each other and projecting radially outwardly. The snow blower 75 is housed in a blower housing 77 integral with the blower rear cover 50. The blower housing 77 has an upper opening to which a snow discharge duct 78 is joined angularly adjustably. Designated by the reference numeral 100 in FIG. 1 is a handle for adjusting the angle of inclination (i.e., the distance for which snow can be discharged) of the snow discharge duct 78. The handle 100 is supported on the frame 11 and has its forward end coupled to the snow discharge duct 78 through a worm gear mechanism (not shown).

Figure 4:
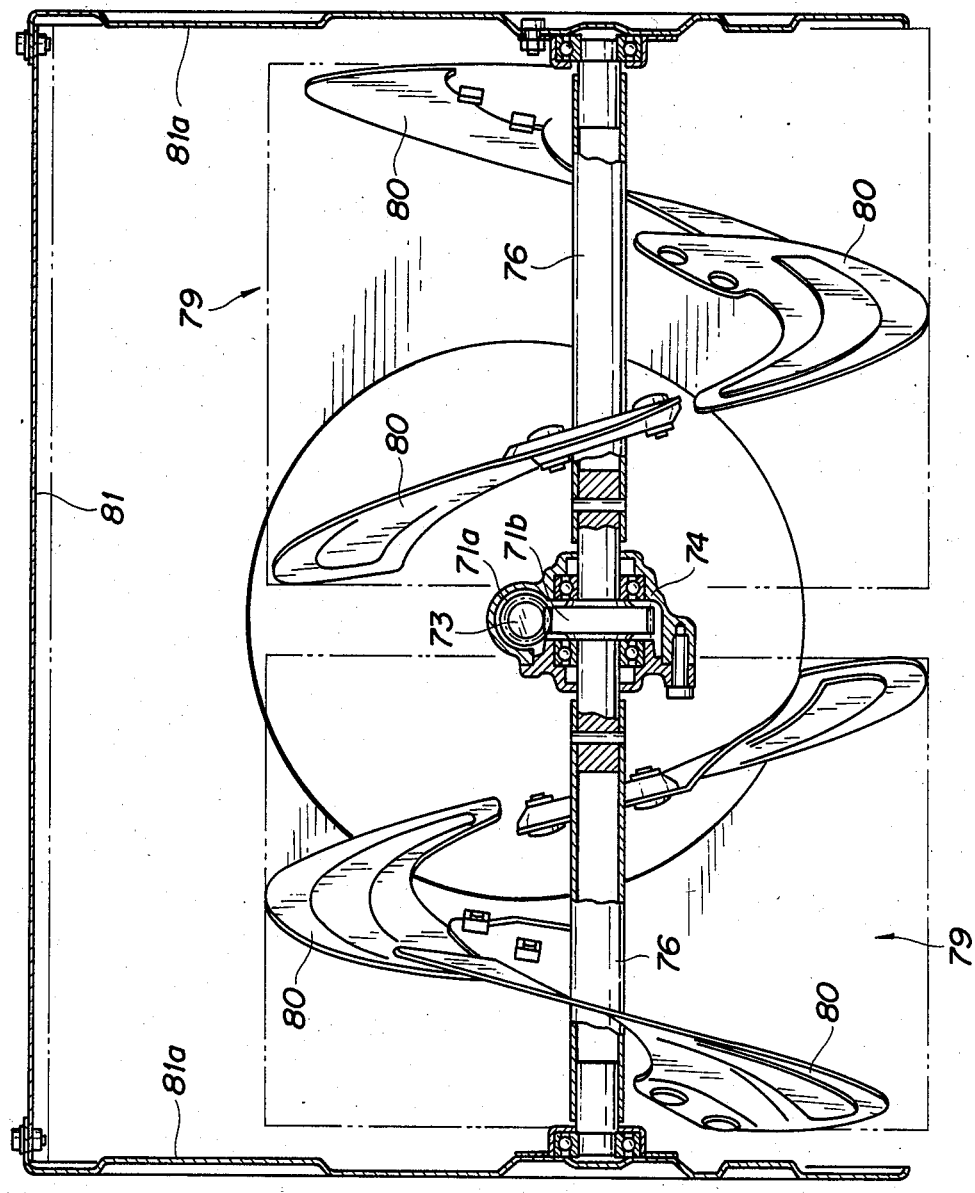
FIG. 4 is a sectional front elevational view of an auger.
Figure 10:
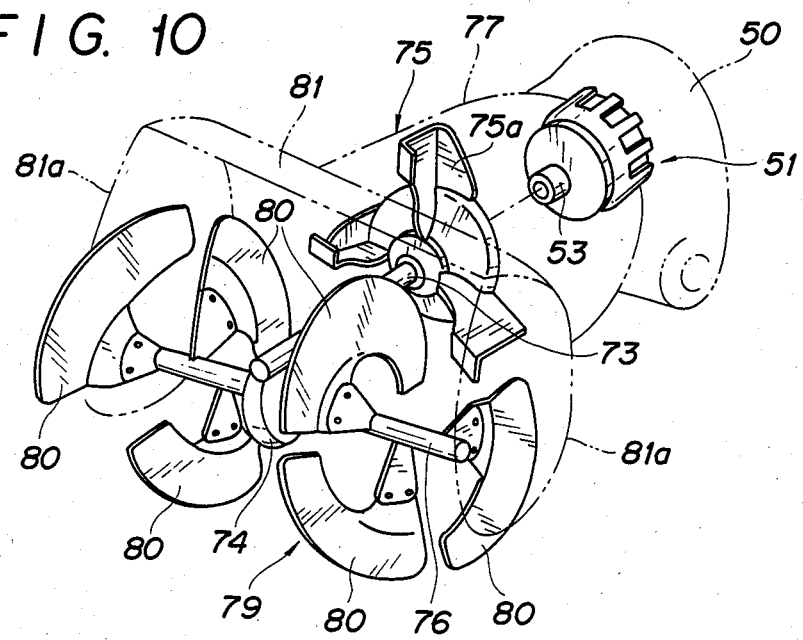
FIG. 10 is a perspective view showing the manner in which an auger and a snow blower are attached to the output shaft of the clutch mechanism.

As illustrated in FIGS. 1 and 4, the worm 71a of the second solid shaft 73b meshes with a worm wheel 71b fixed to an auger drive shaft 76 rotatably supported in the auger bracket 74. As shown in FIGS. 4 and 10, the auger 79 has two auger assemblies 79 which are fixed to the auger drive shaft 76 on opposite sides o the worm wheel 71b. Each of the auger assemblies 79 comprises three helical vanes or fins 80 fixed to the auger drive shaft 76, and is accommodated in an auger cover 81 opening forwardly and having a rear end fixed to the blower housing 77. The blower 75 and the auger 79 serve as working implements. The blower rear cover 50, the blower housing 77, and the auger cover 81 constitute a snow remover cover. Denoted at 81a are side covers of the auger cover 81.

The snow removing machine 1 runs while the crawlers 43 are driven by the engine 13. The auger 79 is driven also by the engine 13 to gather snow, while the snow blower 75 is operated to discharge the gathered snow. More specifically, the snow removing machine 1 starts moving when the crawler control clutch 25 is engaged and the transmission 14 is in the forward or reverse position. As the clutch lever 72 is operated to engage the dry-type clutch 51, the auger 79 and the blower 75 are connected to the engine 13 to gather and discharge snow.

The cylinder 13c of the engine 13 mounted on the frame 11 is tilted to the left in the illustrated embodiment. Therefore, the height of the upper end of the engine 13 from ground is reduced and the center of gravity of the engine 13 is lowered, while at the same time the snow removing machine 1 itself can be handled and operated with ease. The engine 13 does not obstruct the field of view of the driver, so that the driver can have a clear visibility in the forward direction. Since the crankshaft 13b of the engine 13 is operatively coupled to the dry-type clutch 51 through the gears 17, 21, rather than a belt, the vertical distance between the crankshaft 13b and the output shaft 53 is reduced. As a result, the height of the crankshaft 13b from ground and hence the height of the engine 13 from ground are reduced, also giving the driver a clear front visibility and an ability to control the snow removing machine 1 with ease. More specifically, the height of the output shaft 53 from ground is necessarily determined by the dimensions of the auger 79 and the snow blower 75, and cannot be changed. However, since the vertical distance between the output shaft 53 and the crankshaft 13b is reduced by the gears 17, 21, it is possible to locate the engine 13 in a lower position. The height of the engine 13 from ground is thus reduced for a greater front visibility, and the center of gravity of the engine 13 is also lowered for greater ease with which the snow removing machine 1 can be controlled. The crankshaft 13b extends through the transmission case 15 and is connected directly to the transmission 14, and the rear cover 50 behind the snow blower 75 is attached to the transmission case 15. Therefore, the engine 13 is disposed closely to the transmission 14, which is in turn disposed closely to the auger 79 and the snow blower 75. As a consequence, the distance from the engine 13 to the snow blower 75 and the auger 79 is reduced, making it possible to position the engine 13 forwardly away from the handle 12.

The engine 13 is coupled to the auger 79 and the snow blower 75 through the gears 17, 21 and the dry-type clutch 51. This arrangement simplifies the maintenance process as compared with a conventional snow removing machine employing belt tensioners. The auger cover 81 is attached to the blower housing 77, which is integral with the cover 50 of the clutch housing 52. Therefore, the auger cover 81 and the blower housing 77 can successively be detached to expose the dry-type clutch 51, which can easily be maintained. Inasmuch as the transmission case 15, the clutch housing 52, the blower housing 77, and the auger cover 81 are successively fastened to the crankcase 13a of the engine 13, any dead space in the snow removing machine 1 is reduced to thereby achieve a small machine size.

The transmission 14 and the dry-type clutch 51 shares the partition 48, and are housed respectively in the transmission case 15 and the clutch housing 52. Therefore, the transmission 14 and the clutch 51 are positioned with good space efficiency. This results in a further reduction in the entire machine size. Moreover, because the drive shaft 39 for the crawlers 43 is coupled to the output shaft 20 of the transmission 14 through the worm gear 20a, 40, machine maintenance is further simplified.

The partition or front wall 48 of the transmission case 15 and the blower housing 50, which are existing members, jointly define the blower housing 52 in which the dry-type clutch 51 is housed. Thus, no separate housing is necessary for accommodating the clutch 51. Consequently, the snow removing machine 1 is reduced in size and cost.

The spring 68 urges the release lever 67 to turn counterclockwise in FIG. 8 to produce the resilient force in the direction opposite to the control force applied to the clutch lever 72. The shifter 65 is biased by the spring 68 to press the engaging member 63a to move the piston 57 away from the driver and driven plates 56, 59 (as shown by the lower half of the clutch in FIG. 5). Only when the clutch lever 72 is operated, the shifter 65 of the dry-type clutch 51 is moved away from the engaging member 63a against the resiliency of the spring 68 to enable the piston 57 to press the driver and driven plates 56, 59 into frictional contact with each other under the resiliency of the springs 64 (as shown by the upper half of the clutch in FIG. 5). Although the dry-type clutch 51 is of the general construction, it is engaged only when the clutch lever 72 is operated. Therefore, the requirement of transmitting engine power to the auger 79 and the snow blower 75 only when the control lever 72 is operated can be met without involving a cost increase. The clutch lever 72 can be operated with a small force since the dry-type clutch 51 can be actuated with a force equal to the difference between the resilient forces of the springs 68, 64. While the dry-type multi-plate friction clutch is employed in the illustrated embodiment, any of various other general clutches such as a dog clutch may be employed as the clutch 51.

The blower rear cover 50 can be fastened to the transmission case 15 by inserting the bolts 49 from the side of the auger 79 between the blower vanes 75a around the auger/blower drive shaft 73 and threading the bolts 49 into the transmission case 15. Therefore, the cover 50, i.e., the auger 79 and the snow blower 75, can easily be installed on the frame 11.

As shown in FIG. 10, the auger 79 and the snow blower 75 can be detached together from the frame 11 simply by detaching the side covers 81a which support the respective ends of the auger output shaft 76 from the auger cover 81 and thereafter pulling the drive shaft 73 together with the auger 79 and the snow blower 75 away from the output shaft 73 of the clutch mechanism 51. Conversely, the auger 79 and the snow blower 75 can be installed on the frame 11 simply by pushing the splines 73d of the drive shaft 73 into mesh with the splines 53a of the output shaft 53. Therefore, the auger 79 and the snow blower 75 can easily be attached and detached, and the maintenance thereof is facilitated.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A self-propelled snow removing machine, comprising:
 a body frame, said body frame extending rearwardly and upwardly with a steering handle attached to an upper end thereof;
 a snow removing mechanism operatively mounted on a front portion of said body frame;
 a running mechanism operatively mounted on a lower portion of said body frame;
 an engine mounted on said body frame, said engine having an output shaft extending forwardly of the body frame;
 a power transmitting mechanism supported on said body frame and operatively coupled to said engine, said power transmitting mechanism including a transmission for connecting said engine output shaft to said running mechanism and for connecting said engine output shaft to said snow removing mechanism, and a clutch interconnected between said transmission and said snow removing mechanism;
 said engine having a cylinder with its axis inclined laterally of the body frame and extending upwardly at a slight angle to a horizontal plane;
 said power transmitting mechanism being mounted on said body frame forwardly of said engine; and said power transmitting mechanism further including a gear mechanism for coupling said engine output shaft to said transmission and said clutch.

2. A self-propelled snow removing machine according to claim 1, wherein said clutch comprises a dry-type clutch;
said power transmitting mechanism including a transmission case housing said transmission [14]therein and a clutch housing housing said clutch mechanism;
said snow removing mechanism including implement covers attached to a front portion of said transmission case and snow removing implements disposed in said implement covers; and
said transmission case, said clutch housing, and said implement covers being successively coupled together.

3. A self-propelled snow removing machine according to claim 2, wherein said transmission case has a front wall and said clutch housing case has a rear wall, said front and rear walls comprising a common partition.

4. A self-propelled snow removing machine according to claim 2, wherein said clutch housing is defined by a front wall of said transmission case and a rear wall of said implement covers.

5. A self-propelled snow removing machine according to claim 4, wherein said front wall of said transmission case is recessed rearwardly.

6. A self-propelled snow removing machine according to claim 1, further including connecting means for applying a first urging force to said clutch to engage the same, said connecting means including a control lever operable by a machine operator, and disconnecting means for applying a second urging force to said clutch to disengage the same; said disconnecting means including a biasing member for normally applying said second urging force to the clutch.

7. A self-propelled snow removing machine according to claim 2, wherein said snow removing implements include an implement drive shaft having a rear end extending rearwardly through a rear wall of said implement covers, a snow blower, and an auger;
said snow blower having a plurality of fins spaced from each other in a direction in which said drive shaft is rotatable and projecting radially outwardly; and
said rear wall of said implement covers being attached to said transmission case by a plurality of bolts disposed around said drive shaft and threaded from the side of said auger into said transmission case.

8. A self-propelled snow removing machine according to claim 7, wherein said clutch has an output shaft extending forwardly; and
said drive shaft have a rear end, said rear end and said output shaft being splined to each other rearwardly of said implement cover rear wall.

9. A self-propelled snow removing machine according to claim 1, wherein said power transmitting mechanism has a transmission case housing said transmission and into which said engine output shaft projects;
said gear mechanism being disposed in said transmission case;
said snow removing mechanism including implement covers attached to a front portion of said transmission case, an implement drive shaft extending rearwardly through a rear wall of said implement covers, and snow removing implements coupled to said implement drive shaft in said implement covers; and
said clutch being disposed between a front wall of said transmission case and said implement cover rear wall for operatively connecting said implement drive shaft to said gear mechanism.

10. A self-propelled snow removing machine according to claim 9, wherein said running mechanism comprises a crawler drive shaft extending transversely through a lower portion of said transmission case, said crawler drive shaft being coupled to said transmission within said transmission case, a pair of laterally spaced driver wheels mounted on opposite ends, respectively, of said crawler drive shaft, a pair of laterally spaced driven wheels operatively mounted on the lower portion of said body frame, and a pair of laterally spaced crawlers trained around said driver wheels and said driven wheels.

11. A self-propelled snow removing machine according to claim 1, wherein the engine output shaft is positioned above an input shaft of the transmission.

12. A self-propelled snow removing machine, comprising:
a body frame;
a snow removing mechanism operatively mounted on a front portion of said body frame;
a running mechanism operatively mounted on a lower portion of said body frame;
an engine mounted on said body frame;
a power transmitting mechanism supported on said body frame and operatively coupled to said engine;
said power transmitting mechanism including a transmission for connecting said engine to said running mechanism and for connecting said engine to said snow removing mechanism, and a clutch interconnected between said transmission and aid snow removing mechanism;
said power transmitting mechanism having a gear mechanism for coupling said engine to said transmission and said clutch;
said power transmitting mechanism including a transmission case housing said transmission therein and a clutch housing housing said clutch;
said snow removing mechanism including implement covers attached to a front portion of said transmission case; and
said transmission case, said clutch housing, and said implement covers being successively coupled together.

13. A self-propelled snow removing machine according to claim 12, wherein said transmission case has a front wall and said clutch housing has a rear wall, said front and rear walls comprising a common partition.

14. A self-propelled snow removing machine according to claim 12 wherein said clutch housing is defined by a front wall of said transmission case and a rear wall of said implement covers.

15. A self-propelled snow removing machine according to claim 14, wherein said front wall of said transmission case is recessed rearwardly.

16. A self-propelled snow removing machine according to claim 12, further including connecting means for applying an urging force to said clutch to disengage the same, said connecting means including a control lever operable by a machine operator, and disconnecting means for applying said urging force to said clutch to disengage the same.

17. A self-propelled snow removing machine according to claim 12, wherein said snow removing implements include an implement drive shaft having a rear end extending rearwardly extending through a rear wall of said implement covers, a snow blower, and an auger;
   said snow blower having a plurality of fins spaced from each other in a direction in which said drive shaft is rotatable and projecting radially outwardly; and
   said rear wall of said implement covers being attached to said transmission case by a plurality of bolts disposed around said drive shaft and threaded from the side of said auger into said transmission case.

18. A self-propelled snow removing machine according to claim 17, wherein said clutch has an output shaft extending forwardly;
   said drive shaft having a rear end, said rear end and said output shaft being splined to each other rearwardly of said implement cover's rear wall.

* * * * *

UNITED STATES PATENT AND TRADEMARK OFFICE
CERTIFICATE OF CORRECTION

PATENT NO. : 4,783,915

DATED : November 15, 1988

INVENTOR(S) : SASAKI et al.

It is certified that error appears in the above-identified patent and that said Letters Patent is hereby corrected as shown below:

```
Column 2, line 60, after "to be" insert --transmitted--.
Column 3, line 15, before "engine" delete the comma.
Column 5, line 5, after "input" delete the comma.
Column 7, line 62, change "shfiter" to --shifter--.
Column 8, line 31, after "sides" change "o" to --of--.
Column 11, lines 9-10 (claim 2, lines 6-7), delete "mechanism";
          line 20 (claim 3, line 3), after "housing" delete "case";
          line 55 (claim 8, line 4), change "have" to --has--.
Column 12, line 36 (claim 12, line 15), change "aid" to --said--.
In the Abstract, line 34, after "housing" insert --housing--.
```

Signed and Sealed this

Ninth Day of May, 1989

Attest:

DONALD J. QUIGG

*Attesting Officer*     *Commissioner of Patents and Trademarks*